United States Patent
Beyda et al.

(10) Patent No.: US 6,901,080 B1
(45) Date of Patent: May 31, 2005

(54) SYSTEM AND METHOD FOR PROVIDING AN INTERMEDIARY LAYER FOR VOIP CALL PIPE ESTABLISHMENT

(75) Inventors: William J. Beyda, Cupertino, CA (US); Rudolf Bitzinger, Santa Clara, CA (US)

(73) Assignee: Siemens Communoications, Inc., Boca Raton, FL (US)

( * ) Notice: Subject to any disclaimer, the term of this patent is extended or adjusted under 35 U.S.C. 154(b) by 0 days.

(21) Appl. No.: 09/546,264

(22) Filed: Apr. 10, 2000

(51) Int. Cl.[7] .................................................. H04J 3/22
(52) U.S. Cl. ...................... 370/469; 370/400; 370/236
(58) Field of Search ................................ 370/400, 469, 370/236, 351, 352, 465, 466, 401, 229

(56) References Cited

U.S. PATENT DOCUMENTS

| | | | |
|---|---|---|---|
| 6,160,817 A * | 12/2000 | Wille et al. | 370/467 |
| 6,205,149 B1 * | 3/2001 | Lemaire et al. | 370/401 |
| 6,363,065 B1 * | 3/2002 | Thorton et al. | 370/352 |
| 6,483,846 B1 * | 11/2002 | Huang et al. | 370/455 |
| 6,587,457 B1 * | 7/2003 | Mikkonen | 370/356 |

* cited by examiner

*Primary Examiner*—Ajit Patel
*Assistant Examiner*—Steven Blount

(57) ABSTRACT

A Generate QoSEthernet layer (118) is provided, interposed between an IP layer and a QoSEthernet layer (115). The Generate QoSEthernet layer (118) intercepts call commands, such as call setup commands, and identifies a required QoS for the particular call. The Generate QoSEthernet layer (118) then generates the QoS request commands required by the QoSEthernet layer (115).

28 Claims, 7 Drawing Sheets

SYSTEM AND METHOD FOR PROVIDING AN INTERMEDIARY LAYER FOR VOIP CALL PIPE ESTABLISHMENT

BACKGROUND OF THE INVENTION

1. Field of the Invention

The present invention relates to communications systems and, in particular, to an improved system for providing quality-of-service (QoS) in a Voice over IP (VoIP)system.

2. Description of the Related Art

The Internet Protocol (IP) is one of the most popular packet communication and networking protocols being used today. It finds use both on the Internet and in wide area networks (WANs) and local area networks (LANs), such as asynchronous transfer mode (ATM) and Ether networks. The promise of inexpensive voice telephony using the Internet has led to extensive interest in "Voice over IP" (VoIP) and "Telephony over LAN" (ToL) applications. In particular, several IP telephony protocols have been developed, including the H.323 Recommendation suite of protocols promulgated by the International Telecommunications Union (ITU), the Session Initiation Protocol (SIP), and Media Gateway Control Protocol (MGCP), to name a few.

For example FIG. 1A illustrates a protocol stack 100a for a conventional H.323 implementation over an Ethernet IP network. One or more application programs 103a interface to the protocol stack 100a. The H.323 layer 101a includes a control layer 106 supporting H.245 control H.323 signaling for negotiation of media channel usage, Q.931 (H.225.0) for call signaling and call setup, and H.225.0 Registration, Admission and Status (RAS). The H.323 layer 101a may also include a data layer 108 supporting T.120 for data conferencing. The H.323 layer 101a further implements audio codecs 102 and may also implement video codecs 104. An RTP/RTCP layer 110 is provided for sequencing the audio and video packets. The H.323 layer 101a employs UDP and TCP 112 as its transport layer, and also employs an IP layer 114, and then, an Ethernet layer 116. Further details concerning the H.323 Recommendation may be obtained from the International Telecommunications Union; the H.323 Recommendation is hereby incorporated by reference in its entirety as if fully set forth herein.

An important key to the development of ToL and VoIP systems is the development of successful Quality of Service (QoS) IP networks. Generally, QoS refers to the ability of a network to guarantee specific performance levels, related to network bandwidth, availability, jitter, security, and data loss. High voice and/or video quality communication requires high QoS levels on all network segments involved in the communication. Guaranteed QoS has been of particular concern on Ethernet LANs, both due to the bursty nature of IP traffic and the CSMA/CD contention protocol used by Ethernet.

As such, telephony vendors have been developing "Quality of Service Ethernet"(QoSEthernet), which lies between the IP layer and the Ethernet layer in the protocol stack and which provides a guaranteed QoS. Thus, FIG. 1B illustrates a protocol stack 100b including a QoSEthernet layer 115 between the IP layer 114 and the Ethernet layer 116. An exemplary QoSEthernet system is available from Path 1 Network Technologies, Inc., San Diego, Calif., and makes use of the Resource Reservation Protocol (RSVP) and the intserv process, described by the Internet Engineering Task Force (IETF).

In practice, implementation of the QoSEthernet layer 115 requires modified application programs 103b in order to provide the required QoSEthernet information at call setup. That is, each application program(s) 103b must be modified to provide one or more commands in addition to standard H.323 commands in order the required QoS Thus, to support QoSEthernet, a user must not only implement a QoSEthernet layer but also change applications programs, such as telephone, fax, and the like. Further, each application program requires setup and configuration, which can cause added costs and delays in implementation.

SUMMARY OF THE INVENTION

These and other drawbacks in the prior are overcome in large part by a system and method according to the present invention. According to one implementation of the present invention, a Generate QoSEthernet layer is provided, interposed between an IP protocol voice communication layer and the QoSEthernet layer. The Generate QoSEthernet layer intercepts call commands, such as call setup commands, and identifies a required QoS for the particular call. The Generate QoSEthernet layer then generates the QoS request commands required by the QoSEthernet layer.

In one implementation, the Generate QoSEthernet layer is embodied in an H.323 Recommendation telecommunication system. The Generate QoSEthernet layer intercepts the H.225 call setup command, and accesses a database for a corresponding required QoS. The Generate QoSEthernet layer then provides the QoS request to the QoSEthernet layer. Various portions of the call setup command may be utilized for this purpose. For example, the bearer capability, the called party identification, or the conference portions of the call setup command may be associated in database with particular QoS.

In another implementation, the H.245 terminal capabilities exchange is used to determine the required QoS. During the H.245 terminal capabilities exchange, the Generate QoSEthernet layer analyzes the chosen codec(s), and accesses the database for the corresponding required QoS, which is then provided to the QoSEthernet layer.

In still another implementation, the RAS information is used to determine the required QoS. For example, the gatekeeper admission request (ARQ) or bandwidth request (BRQ) signaling may be used to determine the QoS.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–12 illustrate an improved system and method for providing QoS in an Ethernet-type local area network. Call commands are intercepted and used to determine a required QoS. QoSEthernet commands are then provided to a QoSEthernet layer.

Figure 2:
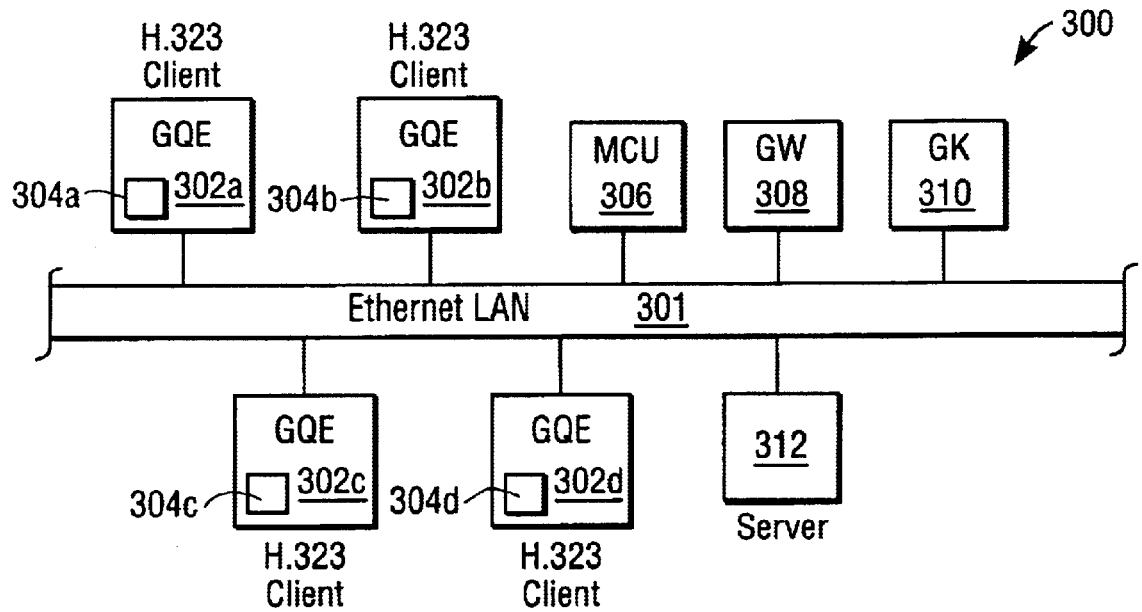
FIG. 2 is a diagram of an exemplary telecommunications system according to an implementation of the invention.

Turning now to the drawings, and with particular attention to FIG. 2, a diagram illustrating an exemplary IP protocol telecommunications system 300 according to an embodiment of the present invention is shown. In particular, the IP protocol communication system 300 may be embodied as an H.323 Recommendation-compatible system. It is noted that, while described herein with regard to an H.323 network, the inventions equally applicable to networks such as MGCP (Media Gateway Control Protocol), SIP+ (Inter MGS Protocol), SGCP, MEGACO, and generally, any voice or multimedia over IP scheme. Further, it is noted that an exemplary generic H.323 system is the HiNet™ RC3000 system, available from Siemens.

The telecommunications system 300 includes a local area network (LAN) or packet network 301 and, particularly, an Ethernet LAN. Coupled to the LAN 301 may be a variety of H.323 terminals 302a–d, a multi-point control unit (MCU) 306, an H.323 gateway 308, an H.323 gatekeeper 310, a LAN server 312, and a plurality of other devices such as personal computers (not shown). The H.323 terminals 302a–d are in compliance with the H.323 Recommendation. Further, the H.323 terminals 302a–d include Generate QoSEthernet controllers or layers 304a–d, as will be described in greater detail below.

Figure 1A:
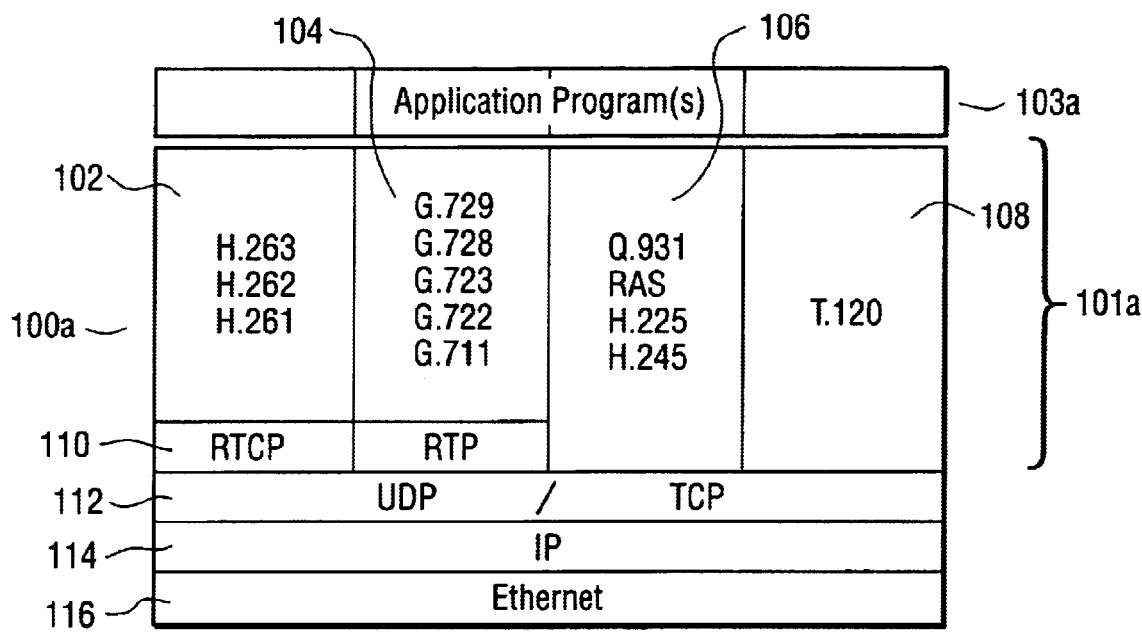
FIG. 1A and FIG. 1B illustrate exemplary program stacks according to the prior art.
Figure 1B:
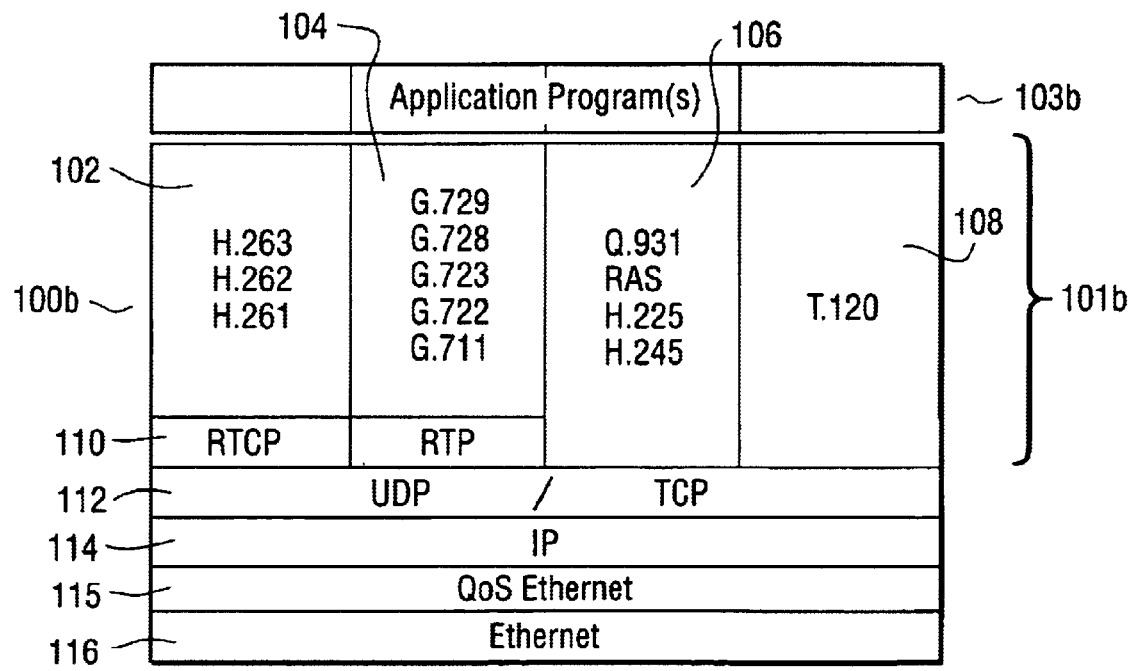
Figure 3:
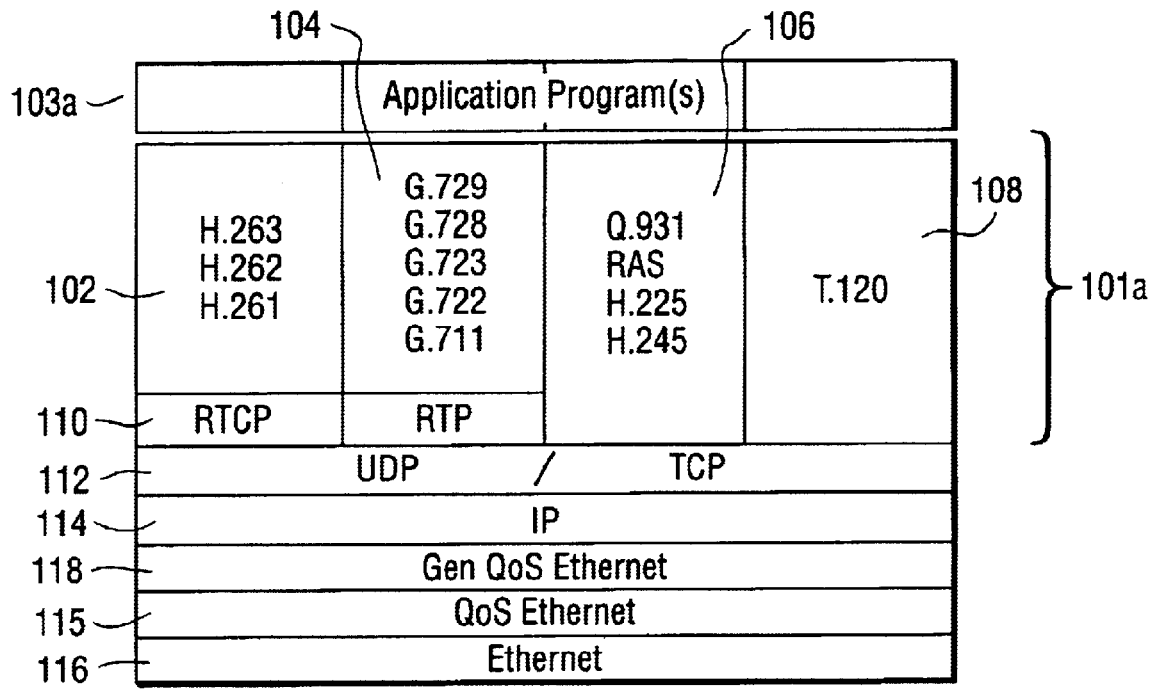
FIG. 3 is an exemplary program stack according to an implementation of the invention.

More particularly, FIG. 3 illustrates a protocol stack according to an implementation of the invention. At the top are one or more application programs 103a. The application programs 103a, such as those of FIG. 1A, may be embodied as one or more telephony programs, such as fax, voice, video, and the like. Next is an Internet Protocol voice communication stack, such as an H.323 protocol stack 101a, similar to that of FIG. 1A. Thus, the H.323 stack includes video codecs 102; audio codecs 104; a control layer 106 supporting H.245 control signaling for negotiation of media channel usage, Q.931 (H.225.0) for call signaling and call setup, and H.225.0 Registration, Admission and Status (RAS); a data layer 108 supporting T.120 for data conferencing; and an RTP/RTCP layer 110. The Internet Protocol voice communication stack 101a lies atop a UDP/TCP layer 112 and an IP layer 114. Also included are a QoSEthernet layer 115 and an Ethernet layer 116. Further, a Generate QoSEthernet layer 118 according to the present invention is provided. The Generate QoSEthernet layer 118 may be provided between the IP layer 114 and the QoSEthernet layer 115, as shown, or may be provided between the H.323 layer 101a and the IP layer 114.

As will be described in greater detail below, the Generate QoSEthernet layer 118 intercepts call commands from the H.323 stack 101a, derives a required QoS therefrom, and generates the appropriate QoS commands for the QoSEthernet layer 115.

Figure 4:
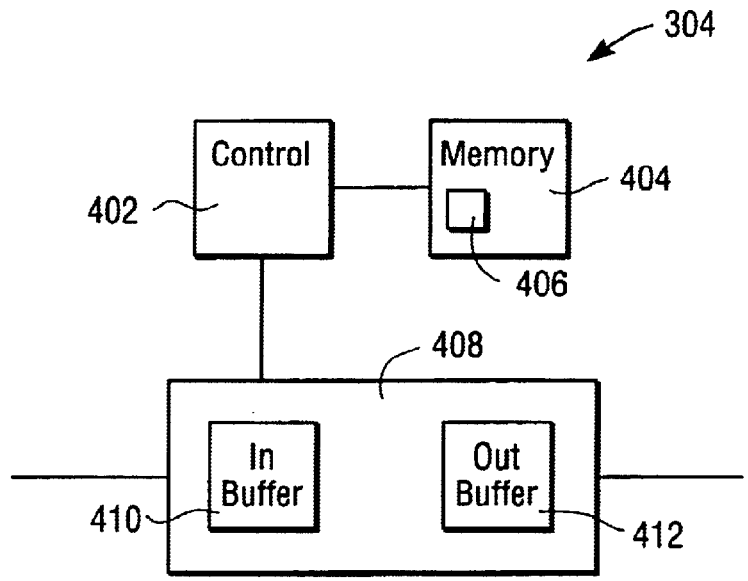
FIG. 4 is a diagram of an exemplary generate quality of service Ethernet module according to an implementation of the invention.

Turning now to FIG. 4, an exemplary Generate QoSEthernet module 304 is illustrated in greater detail. The Generate QoSEthernet module 304 includes a control unit 402 coupled to a memory 404. The memory 404 includes one or more lookup tables or databases 406 for storing conversions between call commands and QoSEthernet commands, as will be explained in greater detail below. The actual mappings may be configured by a system administrator or by the manufacturer. Also included is a buffer unit 408, including an input buffer 410 and an output buffer 412. The input buffer 410 receives the call commands and buffers them during access of the lookup table 406. The call commands are then transferred to the buffer 412 and the appropriate QoS commands inserted into the data stream. The commands are then output from the output buffer to the QoSEthernet.

Figure 5:
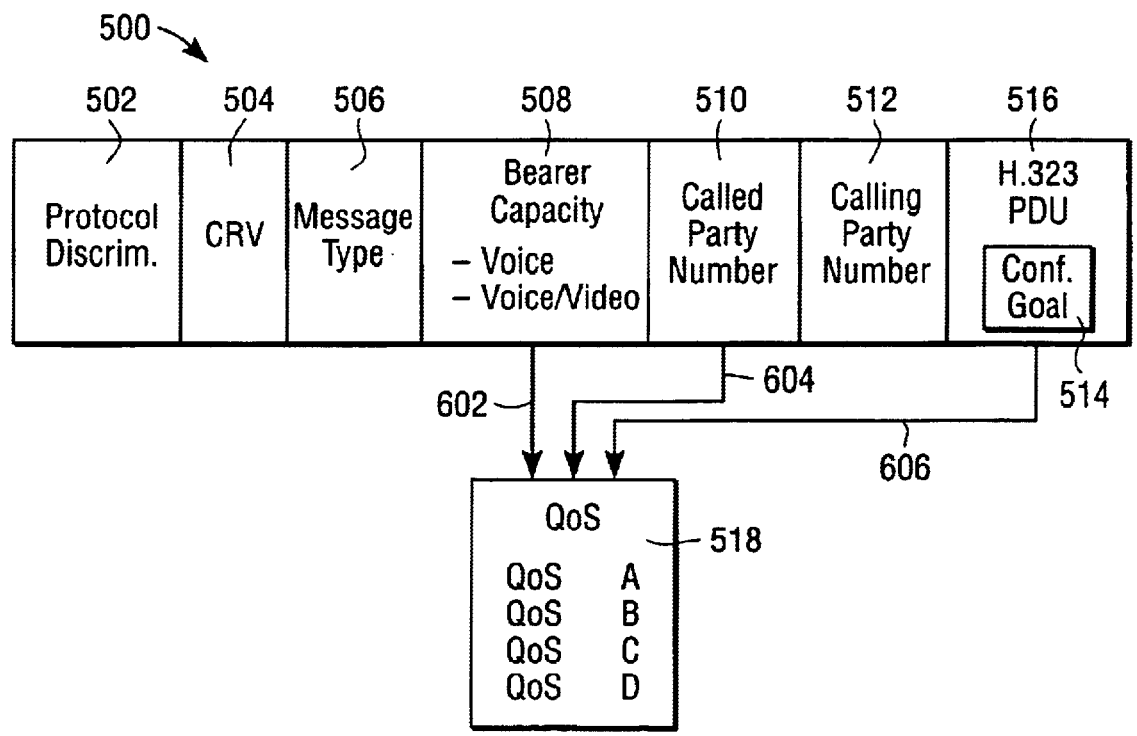
FIG. 5 illustrates schematically use of H.225 call setup for deriving QoS commands according to an implementation of the invention.

As noted above, according to one implementation of the invention the H.225 call setup message is used to derive the QoS required by the QoSEthernet layer 115. FIG. 5 illustrates schematically this process. Shown are an H.225 call setup command 500 and an exemplary QoS table 518. The QoS table 518 includes a plurality of QoS levels A, B, C, and D. The QoS levels A–D provide varying qualities of service. It is noted that, while four QoS levels are shown, in practice, differing numbers may be provided.

The H.225 call setup command 500 includes a protocol discriminator field 502; a conference reference value field 504; a message type field 506; a bearer capability field 508; a called party number field 510; a calling party number field 512; and an H.323 protocol data unit 516, which includes conference goal information 514. As will be explained in greater detail below, the bearer capability field 508 may be mapped to a particular QoS; the called party number 510 may be mapped to a particular QoS; or the conference goal information 514 may be mapped to a particular Qos.

Figure 6A:
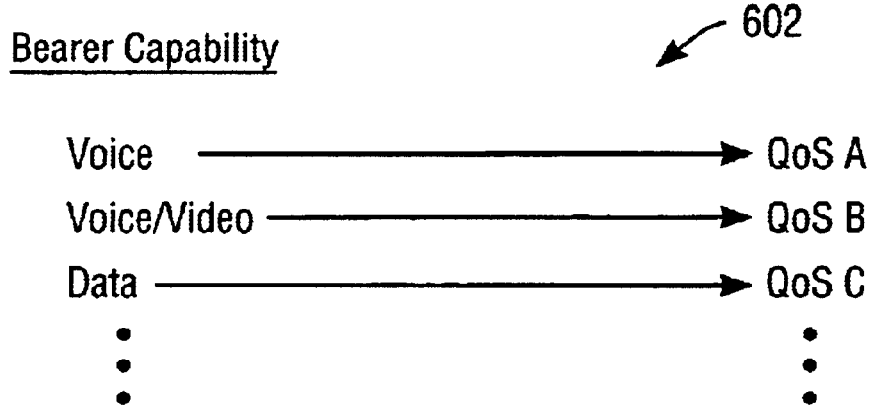
FIGS. 6A–6C illustrate mapping of various call setup commands to QoS levels according to an implementation of the invention.
Figure 6B:
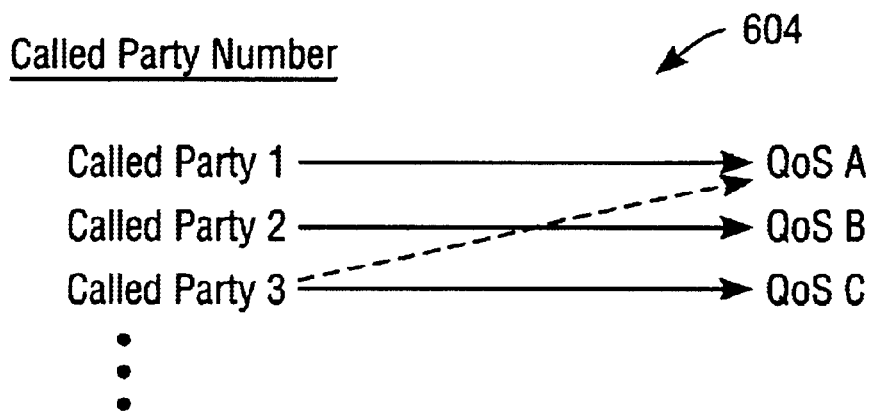
Figure 6C:
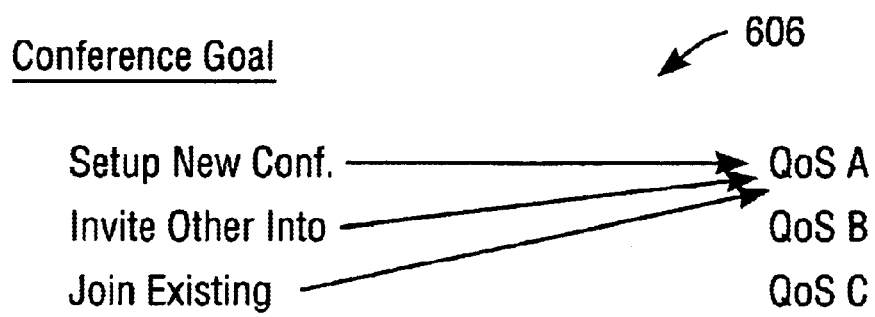

Exemplary mappings are shown in FIGS. 6A–6C. FIG. 6A illustrates the bearer capability field mapping 602. In particular, Voice is mapped to QoS level A; Voice and Video are mapped to QoS level B; and Data is mapped to QoS level C. It is noted that other QoS levels and/or mappings may be provided; thus, the figure is exemplary only. Similarly, FIG. 6B illustrates an exemplary mapping from a called party number 604. As shown, the called party number 1 maps to QoS level A; called party number 2 maps to QoS level B; and called party number 3 maps to QoS level C. Again, various other mappings may occur, as shown, for example, by the dashed line. Finally, the conference goal information 514 may be mapped as shown in FIG. 6C. In particular, as illustrated, whether the conference goal information indicates "set up new conference", "invite other into conference", or "join existing conference", the mapping is to QoS level A. Again, other mappings may be used.

Figure 7:
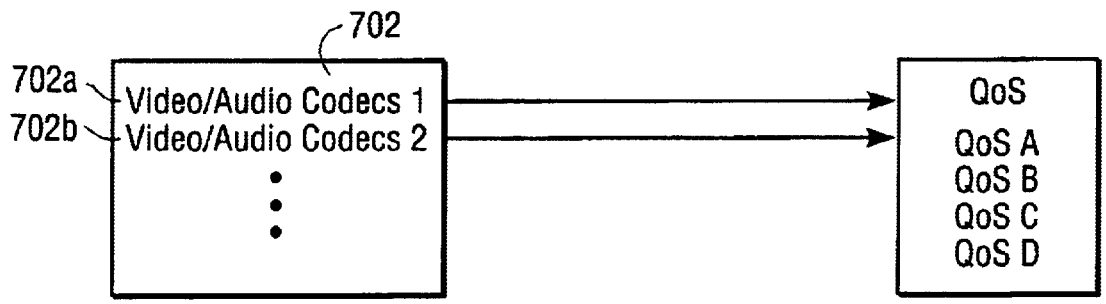
FIG. 7 illustrates use of Terminal Capabilities messaging to derive QoS levels according to an implementation of the invention.

In addition to, or instead of, using the H.225 call setup command, one implementation of the present invention uses the H.245 terminal capabilities exchange to derive the required QoS. As is known, the H.245 Terminal Capability Set command includes a capability table, essentially a list of supported video and audio codecs. Exemplary tables 702 of audio/video codec combinations are shown in FIG. 7. Each table 702a, 702b . . . , may be mapped to a different quality of service level. Thus, video/audio codec setting 1 may map to QoS level A; video/audio codec setting 2 may map to QoS level B.

Figure 8:
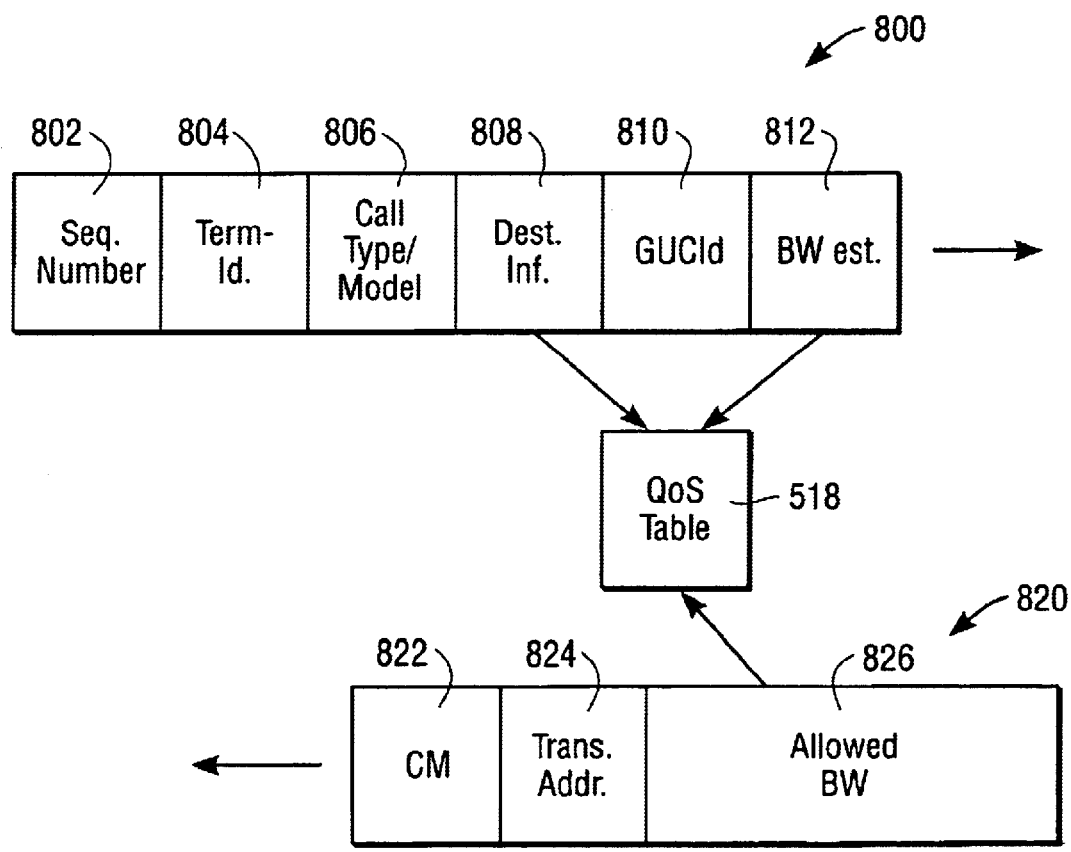
FIG. 8 illustrates use of RAS messaging to derive QoS levels according to an implementation of the invention.

According to yet another implementation of the invention, RAS messaging and, in particular, the gatekeeper Admission Request (ARQ) or Bandwidth Request (BRQ) messages may be used to derive a desired QoS level. For example, FIG. 8 illustrate use of the RAS messaging for QoS derivation. Illustrated are an Admission request (ARQ) message 800, the corresponding QoS table 518, and an Admission Confirm message 820. As is known, the ARQ message 800 includes a sequence number field 802, a terminal identification field 804, call type and call model fields 806, destination information field 808, globally unique call identification 810, and estimated bandwidth 812. The admission confirm message (ACF) 820 includes a call model field 822, a transport address field 824, and an allowed bandwidth field 826. The destination information field 808 of the ARQ message 800 may be used in a manner similar to that described above with reference to the called party number to set the desired QoS field.

Additionally, the bandwidth estimate field 812 may be used to set the QoS levels. More particularly, the bandwidth estimate field 812 provides an estimate of the bandwidth that will be required. Depending on the bandwidth required, higher or lower levels of QoS may be required. If the bandwidth estimate field 812 is used, the allowed bandwidth field 826 on the ACF message 820 may be used, as well. For example, the allowed bandwidth may require an increase or decrease in the QoS level needed. The QoS may also be changed during the call responsive to a Bandwidth Request, in a similar manner.

Figure 9:
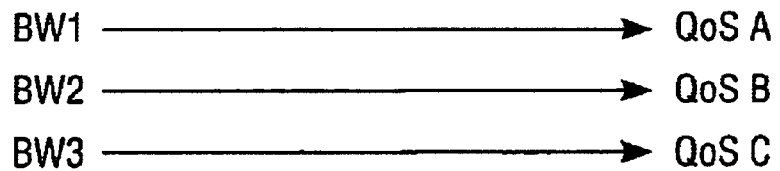
FIG. 9 illustrates mapping of bandwidth levels to QoS levels according to an implementation of the invention.

The actual mapping from bandwidth to QoS level may proceed as generally described above with reference to the H.225 and H.245 mappings. For example, as shown in FIG. 9, a bandwidth level 1 maps to a QoS level A; a bandwidth level 2 maps to QoS level B; and a bandwidth level 3 maps to a QoS level C. Again, other mappings may be employed.

Figure 10:
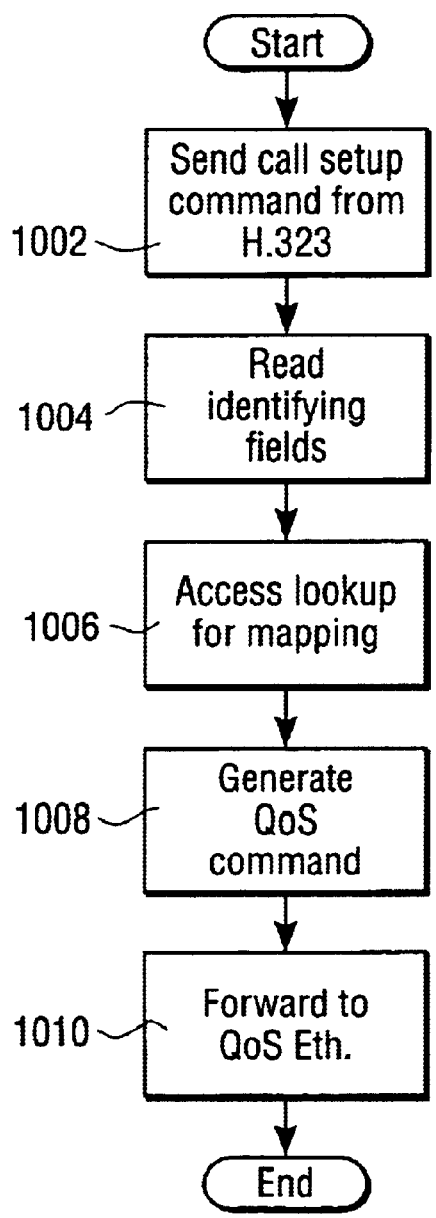
FIG. 10 is a flowchart illustrating operation of an embodiment of the invention.

Operation of an implementation of the invention is shown with reference to the flowchart of FIG. 10. In particular, the flowchart of FIG. 10 illustrates use of the H.225 call setup command for QoS mapping. As shown, in a step 1002, the call setup command is issued, preparatory to making a call. In a step 1004, the call setup command is-received by the Generate QoSEthernet module 304 and QoS identifying fields read. As noted above, this may be the bearer capability field, the called party number field, or the conference goal information. In a step 1006, the control unit 402 of the Generate QoSEthernet module accesses the memory 404 for the QoS mapping, which had been preconfigured. In a step 1008, the appropriate QoS level is identified and the commands required to request that QoS are generated. Finally, in a step 1010, the call setup command and the QoS Ethernet commands are forwarded out of the buffer unit 408 to the QoSEthernet layer.

Figure 11:
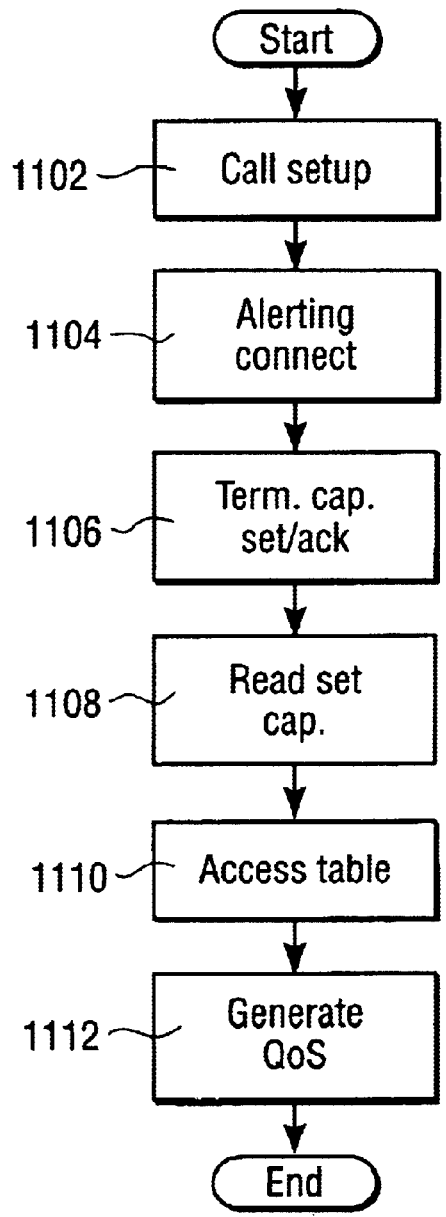
FIG. 11 is a flowchart illustrating operation of an embodiment of the invention.

Operation of another implementation of the invention is shown with reference to the flowchart of FIG. 11. In particular, the flowchart of FIG. 11 illustrates the use of the H.245 terminal capabilities exchange for QoS setting. In a step 1102, the requesting terminal sends a call setup massage. In a step 1104, the receiving terminal sends alerting and connect messages back. Next, in a step 1106, the terminals undertake the terminal capabilities exchange, exchanging the Terminal Capability Set and Acknowledge messages. In step 1108, the Enable QoSEthernet module reads the 402 of the Generate QoSEthernet module accesses the lookup table for the corresponding QoS levels. In a step 1112, the control unit 402 generates the appropriate QoS signaling to the QoSEthernet layer.

Figure 12:
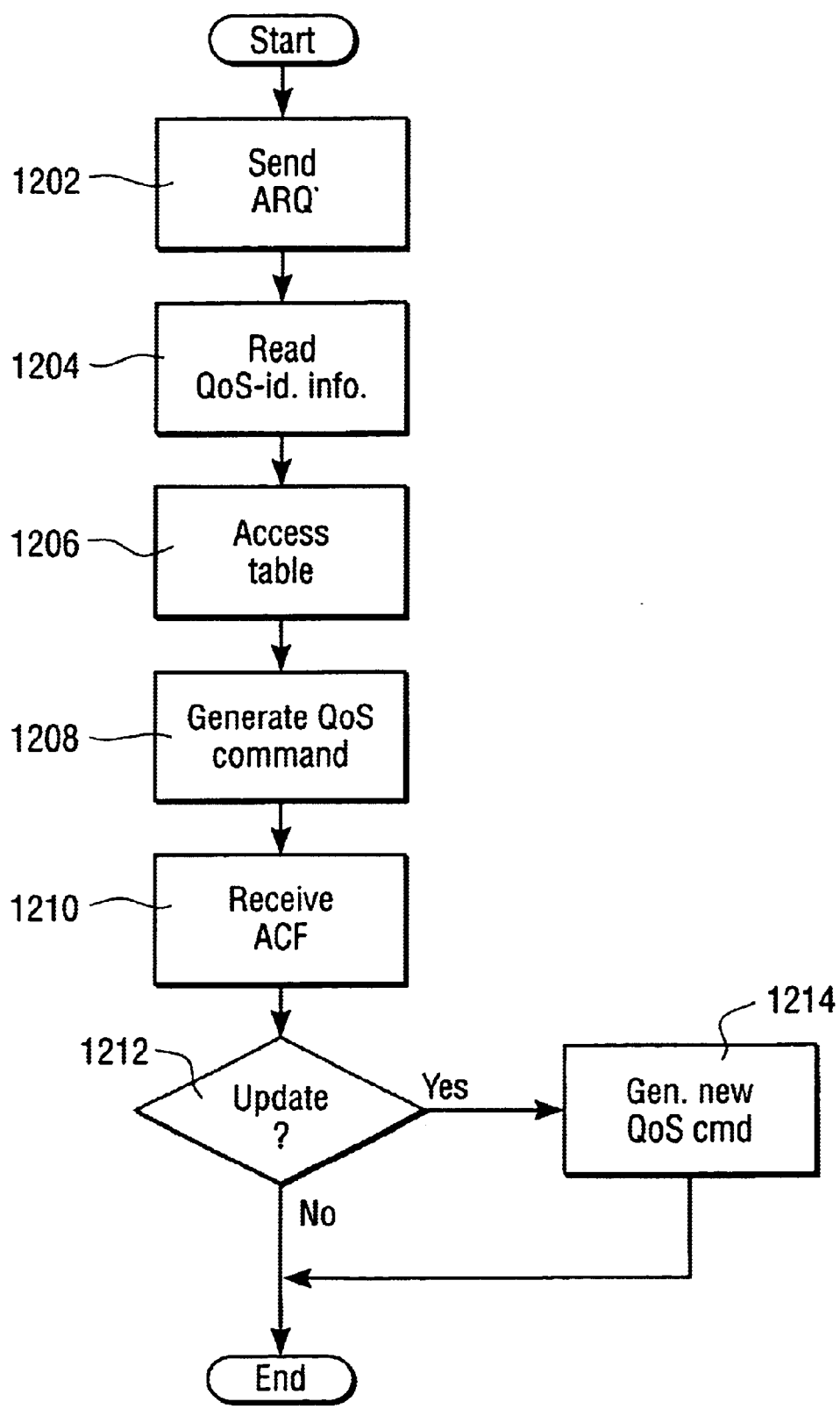
FIG. 12 is a flowchart illustrating operation of an embodiment of the invention.

FIG. 12 illustrates operation of another implementation of the invention. In a step 1202, a client issues an ARQ command to the gatekeeper. In a step 1204, the Generate QoSEthernet module reads the appropriate fields of the ARQ message. As discussed above, this can include the destination information or the bandwidth estimate. In a step 1206, the Generate QoSEthernet module accesses the lookup table for the corresponding QoS command, which is generated in a step 1208.

If the estimated bandwidth field had been used, then, in a step 1210, when the ACF is received from the gatekeeper, the Generate QoSEthernet module may update the QoS command. In particular, the Generate QoSEthernet module reads the allowed bandwidth field from the ACF message and determines if the bandwidth allowed is different and the QoS therefore requires updating, in a step 1212. If so, then the table is accessed and a new QoSEthernet command is issued, in a step 1214. Otherwise, the call proceeds.

The invention described in the above detailed description is not intended to the specific form set forth herein, but is intended to cover such alternatives, modifications and equivalents as can reasonably be included within the spirit and scope of the appended claims.

What is claimed is:

1. A telecommunications system, comprising:
   an Ethernet-type local area network; and
   one or more telecommunications devices coupled to said Ethernet-type local area network, said one or more telecommunications devices including:
   an Internet Protocol voice communication stack;
   a Quality of Service Ethernet layer; and
   a Generate Quality of Service Ethernet layer interposed between said Internet Protocol voice communication stack and said Quality of Service Ethernet layer and adapted to intercept commands from said Internet Protocol voice communication stack, identify from said commands a quality of service required for individual calls, and generate corresponding Quality of Service commands to said Quality of Service Ethernet layer, said Generate Quality of Service Ethernet layer including a control unit, a memory coupled to said control unit and a buffer coupled to said control unit, wherein an input buffer of said buffer receives said commands from said Internet Protocol voice communication stack and buffers said commands during a command conversion, an output buffer of said buffer receiving said commands from said input buffer, said buffer forwarding Quality of Service commands to said Quality of Service Ethernet layer.

2. A telecommunications system in accordance with claim 1, said Internet Protocol voice communications stack comprising an H.323 compatible voice stack.

3. A telecommunications system in accordance with claim 2, said commands comprising H.225 call setup commands.

4. A telecommunications system in accordance with claim 3, said Generate Quality of Service Ethernet layer adapted to translate a bearer capability portion of said H.225 call setup commands into a Quality of Service Ethernet command.

5. A telecommunications system in accordance with claim 3, said Generate Quality of Service Ethernet layer adapted to translate a called party identification portion of said H.225 call setup commands into a Quality of Service Ethernet command.

6. A telecommunications system in accordance with claim 3, said Generate Quality of Service Ethernet layer adapted to translate a conference goal portion of said H.225 call setup commands into a Quality of Service Ethernet command.

7. A telecommunications system in accordance with claim 2, said commands comprising H.245 terminal capabilities commands.

8. A telecommunications system in accordance with claim 7, said Generate Quality of Service Ethernet layer adapted to translate a negotiated terminal capability into a Quality of Service Ethernet command.

9. A telecommunications system in accordance with claim 1, said commands comprising RAS commands.

10. A telecommunications system in accordance with claim 9, said commands comprising Admission Request (ARQ) commands to a gatekeeper.

11. A telecommunications system in accordance with claim 9, said commands comprising Bandwidth Request (BRQ) commands to a gatekeeper.

12. A telecommunications device adapted to be coupled to an Ethernet-type local area network, comprising:

an Internet Protocol communication stack;

a Quality of Service Ethernet layer; and a Generate Quality of Service Ethernet layer Interposed between said Internet Protocol voice communication stack and said Quality of Service Ethernet layer and adapted to intercept call commands from said Internet Protocol voice communication stack, identify from said call commands a quality of service required for individual calls, and generate corresponding Quality of Service commands to said Quality of Service Ethernet layer, said Generate Quality of Service Ethernet layer including control unit, a memory coupled to said control unit and a buffer coupled to said control unit, wherein an input buffer of said buffer receives said call commands from said Internet Protocol voice communication stack and buffers said call commands during a command conversion, an output buffer of said buffer receiving said call commands from said input buffer, said buffer forwarding Quality of Service commands to said Quality of Service Ethernet layer.

13. A telecommunications device in accordance with claim 1 said Internet Protocol voice communications stack comprising an H.323 compatible voice stack.

14. A telecommunications device in accordance with claim 13, said call commands comprising H.225 call setup commands.

15. A telecommunications device in accordance with claim 14, said Generate Quality of Service Ethernet layer adapted to translate a bearer capability portion of said H.225 call setup commands into a Quality of Service Ethernet command.

16. A telecommunications device in accordance with claim 14, said Generate Quality of Service Ethernet layer adapted to translate a called party identification portion of said H.225 call setup commands into a Quality of Service Ethernet command.

17. A telecommunications device in accordance with claim 14, said Generate Quality of Service Ethernet layer adapted to translate a conference goal portion of said H.225 call setup commands into a Quality of Service Ethernet command.

18. A telecommunications device in accordance with claim 13, said call commands comprising H.245 terminal capabilities commands.

19. A telecommunications device in accordance with claim 18, said Generate Quality of Service Ethernet layer adapted to translate a negotiated terminal capability into a Quality of Service Ethernet command.

20. A telecommunications device in accordance with claim 12, said call commands comprising RAS commands.

21. A telecommunications device in accordance with claim 20, said call commands comprising Admission Request (ARQ) commands to a gatekeeper.

22. A telecommunications device in accordance with claim 20, said call commands comprising Bandwidth Request (BRQ) commands to a gatekeeper.

23. A telecommunications system in accordance with claim 1, wherein said memory of said Generate Quality of Service Ethernet layer includes at least one of a lookup table or database for storing conversions between said commands and said Quality of Service commands.

24. A telecommunications system in accordance with claim 23, wherein said control unit accesses said at least one of a lookup table or database for Quality of Service levels.

25. A telecommunications system in accordance with claim 1, wherein said output buffer transfers said commands to said Quality of Service Ethernet Layer.

26. A telecommunications device in accordance with claim 12, wherein said memory of said Generate Quality of Service Ethernet layer includes at least one of a lookup table or database for storing conversions between said commands and said Quality of Service commands.

27. A telecommunications device in accordance with claim 26, wherein said control unit accesses said at least one of a lookup table or database for Quality of Service levels.

28. A telecommunications device in accordance with claim 12, wherein said output buffer transfers said call commands to said Quality of Service Ethernet Layer.

* * * * *